United States Patent
Wiezbowski et al.

[11] Patent Number: 5,902,507
[45] Date of Patent: May 11, 1999

[54] CLOSED LOOP TEMPERATURE CONTROL OF INDUCTION BRAZING

[75] Inventors: Michael F. Wiezbowski, Livonia, Mich.; Jack Levine, Greenfield, Ind.; Ted J. Socha, Dayton, Ohio

[73] Assignee: Chrysler Corporation, Auburn Hills, Mich.

[21] Appl. No.: 08/810,395

[22] Filed: Mar. 3, 1997

[51] Int. Cl.[6] ................................ H05B 6/10
[52] U.S. Cl. .................. 219/615; 219/633; 219/667; 219/659; 219/670
[58] Field of Search ................... 219/615, 616, 219/633, 659, 667, 673, 670

[56] References Cited

U.S. PATENT DOCUMENTS

| | | | |
|---|---|---|---|
| 3,110,793 | 11/1963 | Worthington | 219/615 |
| 3,346,712 | 10/1967 | Seyfried . | |
| 3,504,149 | 3/1970 | Dixon et al. . | |
| 3,842,234 | 10/1974 | Seyfried | 219/670 |
| 3,846,609 | 11/1974 | Enk | 219/639 |
| 4,327,265 | 4/1982 | Edinger et al. | 219/667 |
| 4,359,210 | 11/1982 | Peterson | 266/87 |
| 4,532,396 | 7/1985 | Burack et al. | 219/667 |
| 4,560,849 | 12/1985 | Migliori et al. | 219/667 |
| 4,717,801 | 1/1988 | Brolin et al. . | |
| 4,798,925 | 1/1989 | Ishizaka . | |
| 4,822,971 | 4/1989 | Peterson . | |
| 4,845,332 | 7/1989 | Jancosek et al. . | |
| 5,055,648 | 10/1991 | Iceland et al. . | |
| 5,408,072 | 4/1995 | Nagase | 219/667 |
| 5,414,247 | 5/1995 | Geithman et al. | 219/667 |

*Primary Examiner*—Philip H. Leung
*Attorney, Agent, or Firm*—James R. Yee

[57] ABSTRACT

A method and apparatus for induction brazing wherein the induction coil's power is controlled by a closed loop temperature controller which is provided a temperature signal from a temperature sensor located proximate the brazed joint. Power is supplied to the induction coil until temperature reaches a specific set point corresponding to the desired brazing temperature of the alloy.

12 Claims, 1 Drawing Sheet

CLOSED LOOP TEMPERATURE CONTROL OF INDUCTION BRAZING

BACKGROUND OF THE INVENTION

The present invention relates generally to induction brazing, and, more specifically, to a method and apparatus for controlling the induction brazing process via a closed loop control system controlled by temperature sensed at the brazed joint.

Brazing is a well-known method of joining two metal pieces by fusing a layer of alloy between adjoining surfaces. It also is known to heat the brazing alloy layer in the region of the joint by use of an induction coil encircling the joined members in the plane of the brazing alloy layer (flux) for its fusion. The energy supplied to the induction coil typically is controlled by either visual operation of the heating effect on the brazing ring or by time, that is, the coil is simply powered for a predetermined time, with hopefully the desired result achieved.

This approach leads to problems, particularly when brazing is done of thin-walled members such as condenser tubes of the type used in automotive applications. Such tubes typically are brazed to the condenser via sockets and are constructed of materials with complex chemistry such as aluminum. In such cases, brazing typically is performed with an aluminum alloy. This combination of a thin-walled tube and the complex chemistry of aluminum makes for a difficult mix. For example, it is extremely difficult to control the temperature of aluminum and it is easy to melt through a thin-walled tube during the brazing process. Under heating causes inadequate penetration of the brazing ring into the brazed joint. Such heating variations are exacerbated by variations in the tubing wall dimension, variations in the amount of flux applied, variations in the air gap between the tube and the socket, and variations in the tube's position relative to the induction coil. High scrap rates have resulted from the problems inherent in such brazing processes.

For example, aluminum condensers have been induction brazed by Chrysler Corporation in a manufacturing process typically consisting of brazing ½ inch or ⅝ inch header tubes to a condenser socket. The tubes are manually assembled with a braze ring of an aluminum alloy prior to presentation at the induction machine. Up to 40% of the product typically either requires rework or is scrapped due to heating variations of the brazed joint.

Thus it would be desirable to provide a method and apparatus for induction brazing wherein the energy supplied to the braze alloy could be controlled in a matter to minimize defective brazed joints.

It would further be desirable to provide a method and apparatus for induction brazing wherein the power supplied to the induction coil could be controlled by a signal that is indicative of the state of the brazed joints.

SUMMARY OF THE INVENTION

Accordingly, the present invention provides a method and apparatus for induction brazing in which the power supplied to the induction coil is controlled by a closed-loop temperature controller that is controlled by the temperature in the vicinity of the brazed joint. The use of a closed-loop temperature controller allows for a uniform heat input to the brazed joint, eliminating production scrap or rework. By using the method and apparatus of the present invention Chrysler has increased its throughput from 60% to 90%. In the present invention an optical pyrometer senses the emitted radiation from the brazed joint. A controller conditions the input and provides a signal to the power supply for output power control. The controller is programed to control around a specific set point which corresponds to the desired brazing temperature of the base alloy. With closed loop control the brazing process is rendered insensitive to process variation. Additionally, flux drying ovens no longer are required in the brazing process.

The method and apparatus of the present invention comprises brazing a first member to a second member via an inductive coil placed around a brazing ring of alloy at the brazed joint connection of the two members. Temperature at the brazed joint is sensed via an optical pyrometer and the power to the induction coil is controlled via a closed loop controller to bring the temperature to a specific set point corresponding to the desired brazing temperature of the alloy.

Further features and advantages of the present invention will become more apparent from the following specification taken in connection with the drawings wherein:

DETAILED DESCRIPTION OF THE INVENTION

Figure 1:
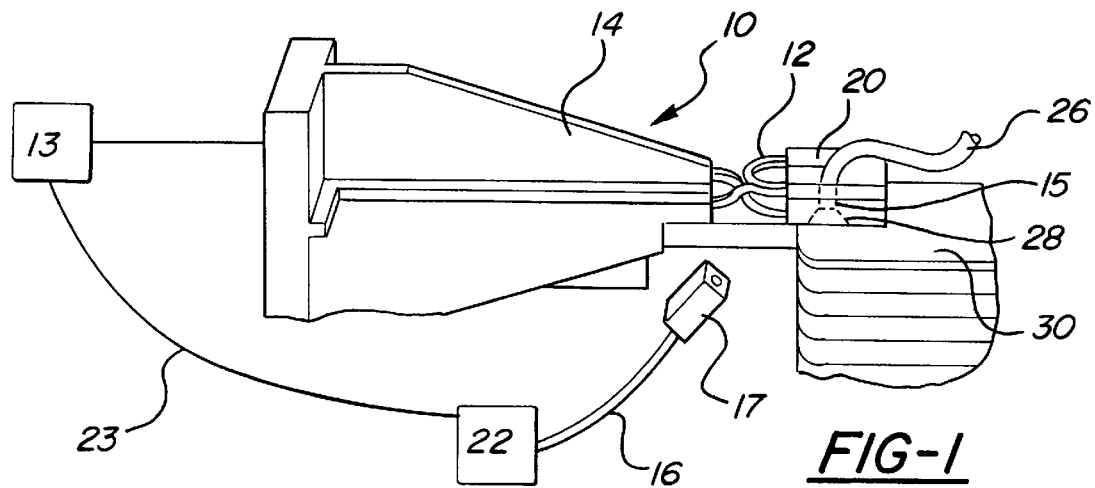
FIG. 1 is a perspective, partially cut-away, partially schematic, view of the apparatus of the present invention.
Figure 2:
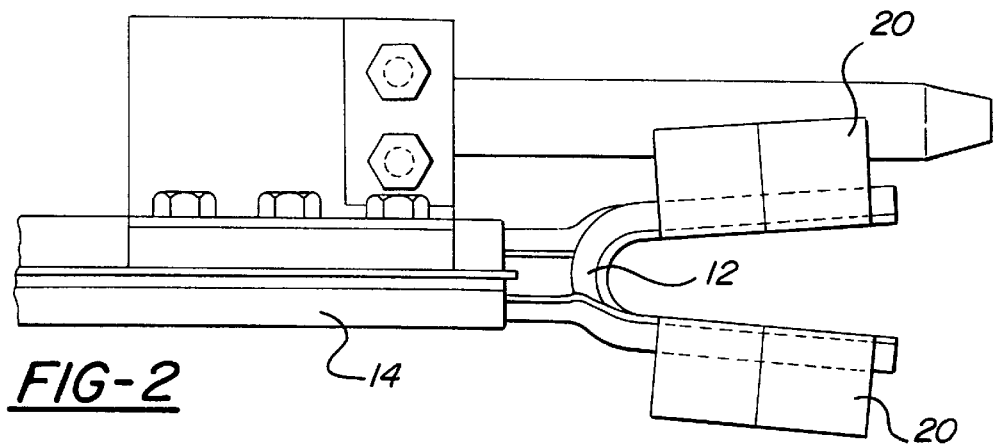
FIG. 2 is a top perspective view of a typical induction coil used with the apparatus and method of the present invention.
Figure 3:
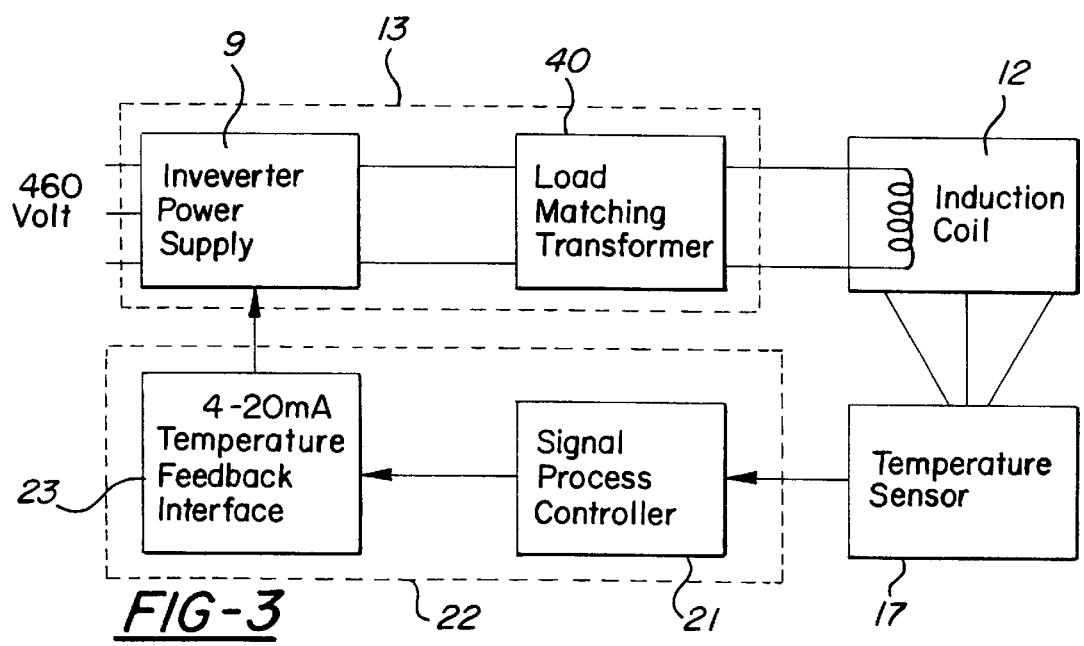
FIG. 3 is a simplified schematic illustration of the electrical circuit of the apparatus of present invention.

FIG. 1, FIG. 2, and FIG. 3 show the apparatus of the present invention. Induction brazing apparatus 10 comprises induction coil 12, preferredly a 10 KHz induction coil of the type that is known in the art and which preferredly comprises C-geometry field intensifier 20 of the type that is known in the art. Coil 12 is electrically connected to power supply 13 via connector means 11 passing through arm 14. Any type of appropriate electrical connection may be used for the electrical connections. Power supply 13 preferredly comprises inverter power supply 9 which supplied with 460 volt power and also preferredly comprises load matching transformer 40. Temperature sensor 17, which preferredly is a dual frequency dual color optical pyrometer of the type that is known in the art, for elimination of emissivity adjustments, senses peak surface temperature in the vicinity of the brazed joint 15, which connects tube 26 to socket 28 of condenser 39. Sensor 17 provides sensed temperature via any appropriate means, such as fiber optical infra-red pickup 16, to controller means 22. Controller means 22 is preferredly a closed loop controller and more preferredly comprises a signal process controller 21 and a 4–20 milliamp feedback interface 23. It may comprise any appropriate type of closed loop temperature control system, however. Means 22 is connected by connecting means 23 to power supply 13 and controls the power supply, means 23 again which may comprise any appropriate type of electrical connection.

In operation, coil 26 is brought into the vicinity of socket 28. A ring of brazing alloy (flux) such as an aluminum alloy is provided at the brazed joint 15. Induction coil 12 is maneuvered into place over the brazed joint via arm 14 and appropriate machinery that is known in the art, the joint connecting adjoining tube 26 and socket 28 of condenser 30. Such tubes typically are aluminum and are thin-walled tubes of ½" to ⅝" in diameter. Power supply 12 is energized, powering the induction coil. The surface temperature in the vicinity of the brazed joint is sensed by sensor 17 and a signal sent to signal process controller means 22. Once peak surface temperature has reached the desired surface temperature within a certain window, 1075° F.±25° F. in the case of aluminum alloy, that being the desired brazing temperature, the controller causes the power supply to shut off.

As is apparent from the foregoing specification, the method and apparatus of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

We claim:

1. A method for induction brazing a joint comprising the steps of:

providing an induction heater having an induction coil, a power supply, an optical pyrometer including an infra-red sensor and a controller means, said power supply operably connected to said induction coil;

providing an amount of an aluminum brazing alloy at said joint;

placing said induction coil proximate to said joint;

providing a control signal to said controller means to actuate said power supply to provide power to said induction coil;

sensing a temperature of said joint with said optical pyrometer by measuring radiation emitted therefrom;

generating an output signal indicative of said temperature;

controlling said power supply in response to said to said output signal; and continuously repeating the previous two steps while said joint is being brazed to maintain said temperature within a predetermined range.

2. The method of claim 1 wherein said induction coil further comprises a field intensifier.

3. The method of claim 1 wherein said optical pyrometer is spaced apart from said induction coil and located proximate to said joint.

4. The method of claim 1 wherein said optical pyrometer includes a fiber-optical infra-red pickup for sensing said temperature.

5. The method of claim 1 wherein said predetermined temperature range includes temperatures ranging from about 1050° F. to 1100° F.

6. A method for induction brazing a first member to a second member comprising the steps of:

providing an induction heater having an induction coil, a power supply, an optical pyrometer including an infra-red sensor and controller means, said power supply operably connected to said induction coil, said optical pyrometer adapted to sense a temperature of an area proximate to an intersection between said first and second members and generate a signal indicative of said temperature, and said controller means being operably connected to said power supply and said optical pyrometer, said controller means controlling an output of said power supply;

bringing said first and second members into close proximity to create a joint;

providing an amount of an aluminum brazing alloy at said joint;

placing said induction coil proximate to said joint;

providing power to said induction coil;

sensing said temperature with said optical pyrometer by measuring radiation emitted therefrom;

controlling said power supply in response to said changes in said signal from said optical pyrometer; and continuously repeating the previous two steps while said joint is being brazed to maintain said temperature within a predetermined range.

7. The method of claim 6 wherein said induction coil further comprises a field intensifier.

8. The method of claim 6 wherein said optical pyrometer is spaced apart from said induction coil and located proximate to said joint.

9. The method of claim 6 wherein said optical pyrometer includes a fiber-optical infra-red pickup for sensing said temperature.

10. The method of claim 6 wherein said predetermined temperature range includes temperatures ranging from about 1050° F. to 1100° F.

11. In an apparatus of induction brazing a first member to a second member at a brazed joint with an amount of an aluminum brazing alloy, said apparatus comprising:

an induction coil;

a power supply operably connected to said induction coil;

an optical pyrometer including an infra-red sensor for sensing radiation emitted from an area proximate to an intersection between said first and second members and generating a signal indicative of a temperature thereof;

controller means operably connected to said power supply and said optical pyrometer;

wherein said controller means controls an output of said power supply in a closed-loop manner in response to changes in said signal from said optical pyrometer to maintain said temperature within a predetermined temperature range.

12. The apparatus of claim 11 wherein said induction coil further comprises a field intensifier.

* * * * *